——— POLY[N-PHENYL MALEIMIDE/ISOBUTENE]
— — — — — POLYETHYLENE TEREPHTHALATE
—·——·— POLYCARBONATE DERIVED FROM 2,2-BIS(P-HYDROXYPHENYL) PROPANE

Feb. 4, 1969

I. T. BARRIE ET AL 3,426,228

ELECTRICAL APPARATUS

Filed Feb. 26, 1965

INVENTORS
IAN TORRANCE BARRIE
ERIC NIELD
BY Cushman, Darby & Cushman
ATTORNEYS

United States Patent Office 3,426,228
Patented Feb. 4, 1969

3,426,228
ELECTRICAL APPARATUS
Ian Torrance Barrie, Amwell, and Eric Nield, Ware, England, assignors to Imperial Chemical Industries Limited, London, England, a corporation of Great Britain
Filed Feb. 26, 1965, Ser. No. 435,451
Claims priority, application Great Britain, Mar. 11, 1964, 10,301/64
U.S. Cl. 310—215  18 Claims
Int. Cl. H02k 3/36; H01f 27/32; H01b 7/02

ABSTRACT OF THE DISCLOSURE

An electrical conductor which incorporates insulation which comprises a copolymer of (i) from 99% to 1% molar of at least one N-aryl maleimide of the formula

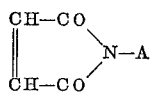

in which A is an aryl radical and (ii) from 1% to 99% molar of at least one ethylenically unsaturated hydrocarbon. These copolymers have power factors which are surprisingly low in view of the polar nature of the N-substituted maleimides. Furthermore, the capacitance of a capacitor in which the dielectric comprises one of the N-substituted maleimide copolymers varies very little with temperature.

Disclosure

This invention relates to electrical apparatus and more particularly to insulated electrical conductors.

According to the present invention, an electrical conductor incorporates insulation which comprises a copolymer of (i) from 99% to 1% molar of at least one N-aryl maleimide of the formula

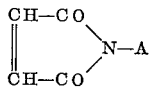

in which A is an aryl radical and (ii) from 1% to 99% molar of at least one ethylenically unsaturated hydrocarbon.

The aryl radical is a monovalent aromatic radical such as that derived from benzene or a polynuclear aromatic hydrocarbon by the loss of an aromatically bound hydrogen atom. Typical examples of monovalent atoms or groups that may replace one or more of the aromatically bound hydrogen atoms of the aryl radical are halogen atoms, hydroxyl groups, and groups of formulae —R, —OR, —SR, and —NO$_2$ where R is a monovalent hydrocarbon radical or a halogenated derivative thereof, preferably containing from 1 to 4 carbon atoms.

Examples of ethylenically unsaturated hydrocarbons are: alkenes such as ethylene, propylene, butene-1, isobutene, pentene, 2-methylbutene-1, cyclohexene, methylenecyclohexane, 2-methylpentene-1 and 2,4,4-trimethylpentene-1; aralkenes such as styrene and α-methylstyrene; and dienes such as butadiene.

The copolymers may be formed by processes comprising polymerisation in bulk, in solution in a suitable solvent, or in aqueous dispersion and in the presence of a free-radical initiator such as an organic peroxide.

It has now been found that these copolymers have power factors which are surprisingly low in view of the polar nature of the N-substituted maleimides. For example, copolymers derived from N-aryl maleimides in which the aryl radical is free from polar substituents generally display power factors which are lower than those of any other polymers containing residues from monomer units having polar groups. Examples of such copolymers are those derived from N-phenylmaleimide and isobutene, N-phenylmaleimide and butadiene, N-phenylmaleimide and styrene, and N-o-tolylmaleimide and isobutene. Furthermore, the power factors in the audio-frequency range show little noticeable change with temperature in the range of from −10° C. to above 160° C. Comparison of the power factor of an equimolar N-phenylmaleimide/isobutene copolymer at temperatures ranging from −140° C. to +160° C. with that of a commercially available polyethylene terephthalate and that of a commercially available polycarbonate (both of which are widely used as dielectric materials) is made in the graph in FIGURE 1 of the accompanying drawings, as explained in Example 1 below. The power factor of the N-phenylmaleimide/isobutene copolymer is only about 0.0007 between 0° C. and 140° C. and compares favourably with that of the polycarbonate (0.0012–0.0015) and that of the polyester (0.0015–0.004 between 30° C. to 100° C.), both of which are generally accepted as having very low power factors for materials derived from polar monomers.

This low power factor combined with the ability of the polymer to be moulded into shaped parts or deposited in the form of coatings or self-supporting films from solution in a readily available solvent such as chloroform makes the specified copolymers of N-substituted maleimides of particular interest as insulating materials and allows the manufacture of insulation of thin section with good insulating properties for electrical conductors; for example a 20 gauge film of such a polymer has been found to have a resistivity of about $10^{14}$ to $10^{15}$ ohm.cm.

Examples of the use of the polymers as insulation include coatings on wire (for instance in windings for transformers, electrical motors and dynamos), mouldings (for instance as insulators for armature slots, commutator segments and commutator V rings) and film (for example as insulating wrapping for cables or as a base for conductive coatings). Coatings from the polymers may be formed by deposition from solution or by extrusion. Mouldings may be formed in any suitable manner such as injection-moulding or compression-moulding or extrusion. Films may be solvent-cast or extruded and may be oriented by drawing if desired.

The ability of the specified copolymers of N-substituted maleimides to form thin flexible films which may be oriented and metallised, which are serviceable over a wide range of temperatures, and which have a high resistivity in thin section, makes them of marked interest in the manufacture of capacitors. Those polymers which display a power factor that is essentially unchanged over wide temperature ranges are useful in the manufacture of capacitors which tend to heat up during operation or are required to operate under conditions of elevated temperatures.

Furthermore, it has been found that the capacitance of a capacitor in which the dielectric comprises one of the N-substituted maleimide copolymers varies very little with temperature. By way of example, between the temperatures of −70° C. and +100° C. the capacitance at 1000 cycles of a capacitor in which the dielectric comprises a film derived from a copolymer of equimolar quantities of N-phenylmaleimide and isobutene changes by less than ±3% from its value at 20° C. This degree of electrical stability is of particular use in circuits requiring a high degree of frequency selectivity over a significant temperature range. These include, for example, resistance-capacitance circuits, for instance as used in timing devices, and integration circuits in computors.

Capacitors formed from metallised film of the specified copolymers are particularly suitable for use in situations where space is at a premium since very small components may be made which are effective in applications requiring the use of large voltages. Another method of forming the capacitors is to roll them (e.g., from paper or glass fibre) and then impregnate them with a mixture of the monomers and catalyst in the proportion required to give a desired copolymer and then to effect polymerisation in situ.

Other uses for the polymers as insulators include slot liners and phase insulation for electric motors. In these cases, the polymer may be used in the form of a moulding or as a film, either alone or on a backing, for example of press board, asbestos, paper or mica. The good physical properties of the polymers and their high resistance to electrical stress allow much thinner liners to be used than is possible with conventional materials and this enables motors to be built with a higher rating for a given size, or conversely a smaller and cheaper motor to be built for a given rating.

The polymers may also be used as inter-layer and inter-coil insulation in chokes, transformers, television scanning coils and the like. The high electric strength of the polymers leads to the use of thinner films as compared with conventional insulations with concomitant saving in weight, space and conductor material. A particular use for the polymer film is as insulation in scanning coils where more accurate focussing may result because of the closer proximity of the various coils.

In cable manufacture, where space is frequently at a premium, the high resistance to electrical and mechanical stresses possessed by film of the specified polymers enables a useful reduction in size to be achieved when it is wrapped on conductors or where groups of conductors are taped together with it within a cable. Thus, the film may find use in multi-core cables (e.g., in radar installations) where both the core and each core layer are wrapped with it, in twin-core power cable (where the film may also prevent adhesion between the cores and the sheath), and in miniature electrical cable for electronic equipment where each individual core may be screened and wrapped with the film.

Copolymers derived from N-substituted maleimides in which the nitrogen atom is directly linked to an aromatic carbon atom generally have high softening points and low water sensitivity. The insulation derived from these polymers may be used at temperatures up to their softening point or even above without serious degradation occurring.

The preferred copolymers for use in the articles of the invention are those derived from such an N-aryl maleimide and (as comonomers) ethylene, propylene, styrene, hydrocarbon-substituted derivatives of styrene or vinylidene hydrocarbons of the formula $CH_2:CR^1R^2$ in which $R^1$ and $R^2$ are severally monovalent hydrocarbon radicals, preferably alkyl groups. Examples of such vinylidene hydrocarbons are isobutene, 2-methylbutene-1, 2-methylpentene-1 and 2,4,4-trimethylpentene-1.

For most purposes, copolymers containing approximately equimolar amounts of N-substituted maleimide and hydrocarbon residues are preferred; decreasing the amount of hydrocarbon in the polymer generally increases brittleness, while on the other hand with many of the monomer combinations it is difficult to obtain polymers containing more than 50% molar of hydrocarbon units in the chain.

While the polymers may contain additives such as plasticisers, fillers, antioxidants, light stabilisers, lubricants and the like and may be blended with other natural or synthetic polymers, we prefer to use them in substantially pure state so as to take full advantage of their low power factor.

The invention is illustrated by the following examples, reference being made to the drawings in which.

Example 1

A sheet of a copolymer derived from N-phenylmaleimide and isobutene in approximately equimolar proportions and having a reduced viscosity of 0.78 (measured on a solution of 0.5 g. of polymer in 100 cm.$^3$ of dimethylformamide at 25° C.) was formed by pressing the copolymer in powder form at 290° C. and 500 kg./cm.$^2$ pressure for five minutes. After pressing, the sample was quenched. The sheet so formed was 1.679 mm. thick and was ground to yield a disc 1 which was 53 mm. in diameter.

Figure 1:
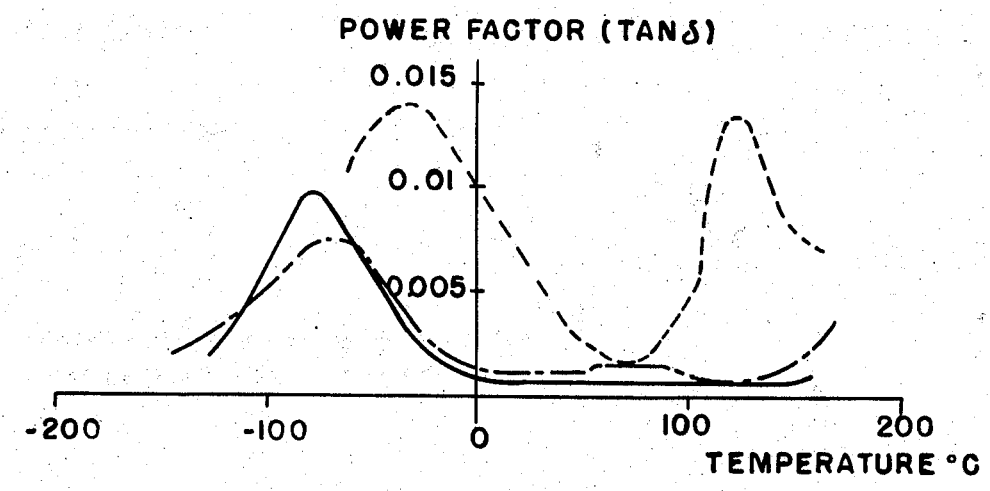
FIG. 1 is a graph comparing the power factor of one of the instant copolymers with the power factors of other polymers.

By vacuum deposition of aluminium, the disc was then provided with concentric circular metal electrodes to form a capacitor. The electrode 2 on one side of the disc was 50 mm. in diameter and the electrode 3 on the other side 40 mm. in diameter. The power factor of the copolymer at 1000 cycles/second was then measured over a range of temperatures using a modified Conjugate Schering bridge which was fully guarded in a three-terminal system and provided with Wagner earth balancing arm facilities. During measurement, the capacitor was housed in a 3-terminal brass electrode system under light spring pressure which allowed the electrodes to follow the changes in thickness of the capacitor with temperature. The assembly was placed in a temperature controller and connected to the bridge by leads, the length of which (76 cm.) had no significant effect on the experimental values obtained. Measurements of power factor were made at intervals of 20° C. and temperature control was to within ±0.2° C. or better. The results were plotted as the continuous line graph set out in FIGURE 1 of the accompanying drawings. These results were compared with those measured under similar conditions for a commercially available polyethylene terephthalate (broken line) and a commercially available polycarbonate (dash-dot line) derived from 2,2-bis-(p-hydroxyphenyl)propane.

The power factors obtained by this method, like all the other electrical measurements described in later examples, may be subject to small changes with variation in the moisture content of the polymer tested.

Figure 2:
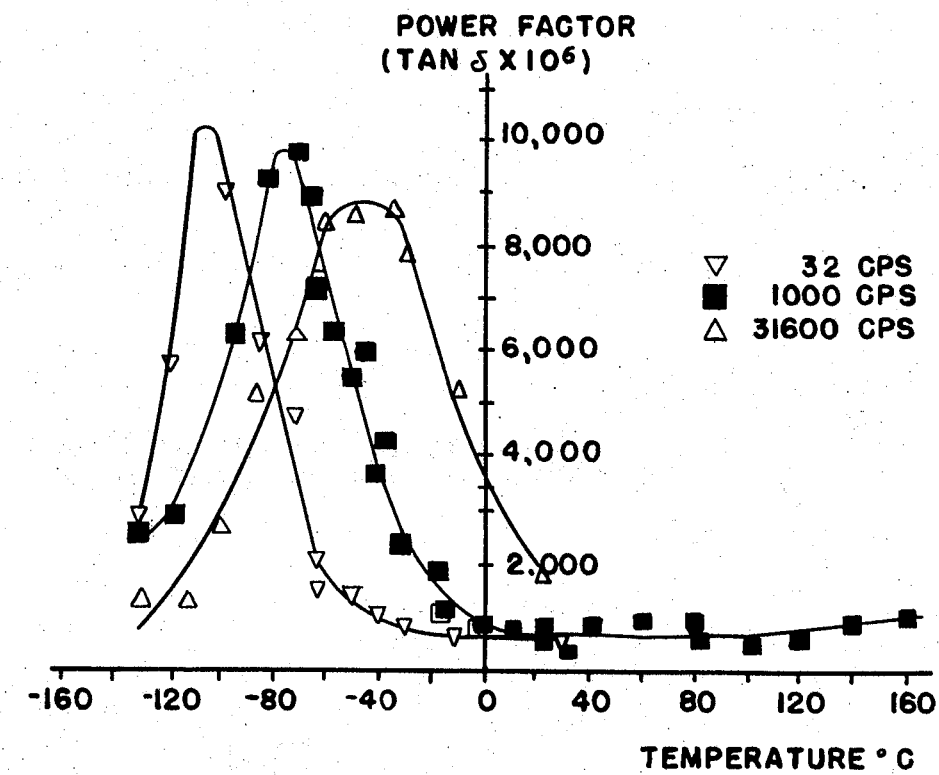
FIG. 2 is a graph comparing power factors of one of the instant copolymers as measured at various frequencies and over a range of temperatures.

The power factor of the N-phenylmaleimide/isobutene copolymer was also measured by the same method over a range of temperatures at 32 cycles/second and 31,600 cycles/second. The curves so obtained are compared in FIGURE 2 with the curve obtained at 1000 cycles/second. It can be seen that even at very high frequencies the power factor is below 0.003 at room temperature.

Figure 3:
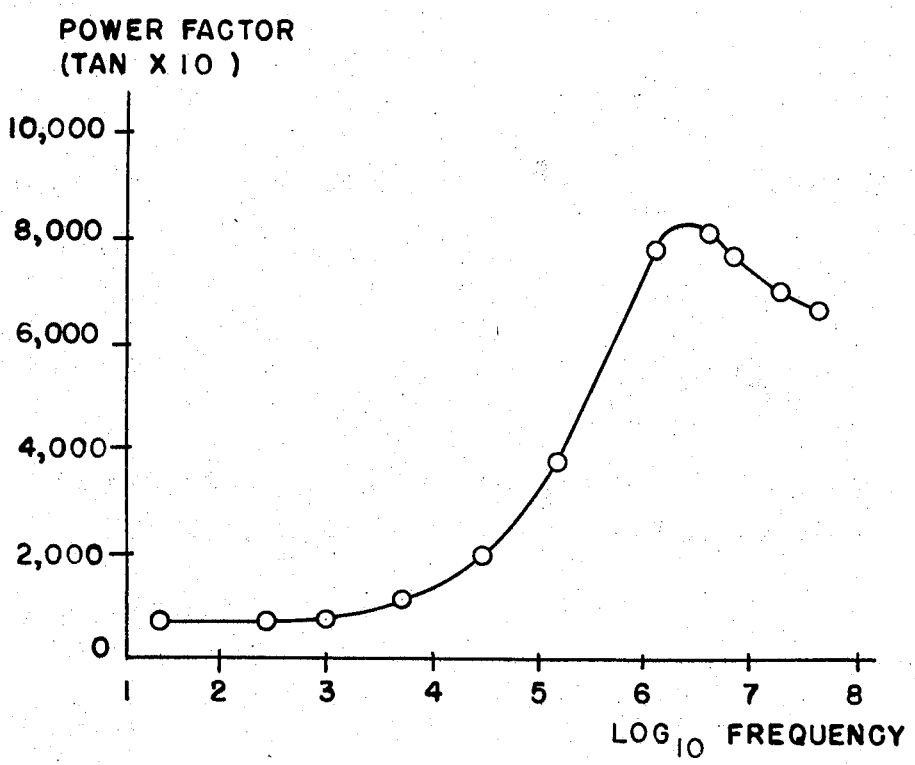
FIG. 3 is a graph of the power factor of one of the instant copolymers as a function of $Log_{10}$ frequency.

In a further series of experiments, the power factor of the N-phenylmaleimide/isobutene copolymer was measured at constant temperature (20° C.) over a range of frequencies, and the curve so obtained is shown in FIGURE 3 which shows that even at frequencies as high as 100 kilocycles, the power factor is less than 0.004 at room temperature. The power factors at radio frequencies were measured on the unmetallised polymer disc (described above) using a method based on that of Hartshorn and Ward.

Example 2

Figure 4:
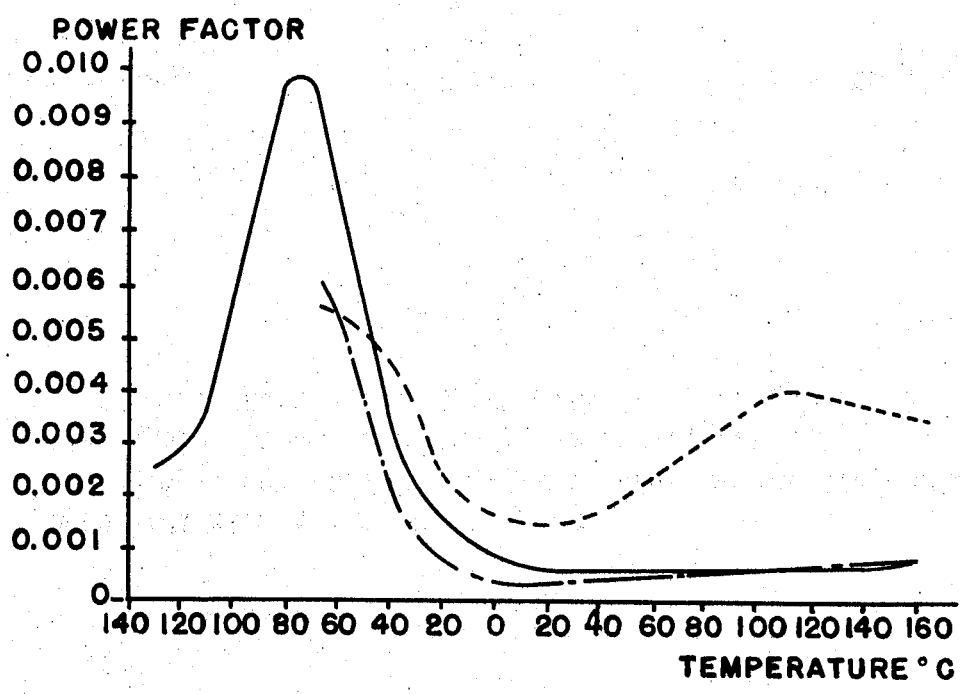
FIG. 4 is a graph comparing power factor of various polymers over a temperature range.

A sheet of a copolymer derived from N-phenylmaleimide and styrene in approximately equimolar proportions and having a reduced viscosity of 2.06 (measured on a solution of 0.5 g. of polymer in 100 cm.$^3$ of dimethylformamide at 25° C.) was formed by pressing the copolymer in powder form at 270° C. and 500 kg./cm.$^2$ pressure for five minutes. The sheet, which was 0.89 mm. thick, was ground to a circular disc 25 mm. in diameter and the disc was provided by vacuum deposition with two concentric circular aluminium electrodes to form a capacitor. Another capacitor of identical construction was formed from a sheet derived from a substantially equimolar copolymer of N-o-chlorophenyl-maleimide and isobutene having a reduced viscosity of 0.85 (as measured on a solution of 0.5 g. of copolymer in 100 cm.$^3$ of dimethylformamide at 25° C.). The power factor of the dielectric material of each of these capacitors was measured using the apparatus and conditions described in Example 1 at 1000 cycles and at intervals of 20° C. over the range —60° C. to +160° C. The curve obtained for each is shown in FIGURE 4 together with that of the N-phenylmaleimide/isobutene copolymer. It may be seen that the N-phenylmaleimide/styrene copolymer shows the best power factor over the temperature range —60° C. to +100° C., while the graph of the power factor of the N-o-chlorophenyl-maleimide/isobutene copolymer shows the modifying effect of having a polar substituent on the aromatic nucleus attached to the imido nitrogen atom.

Example 3

Figure 5:
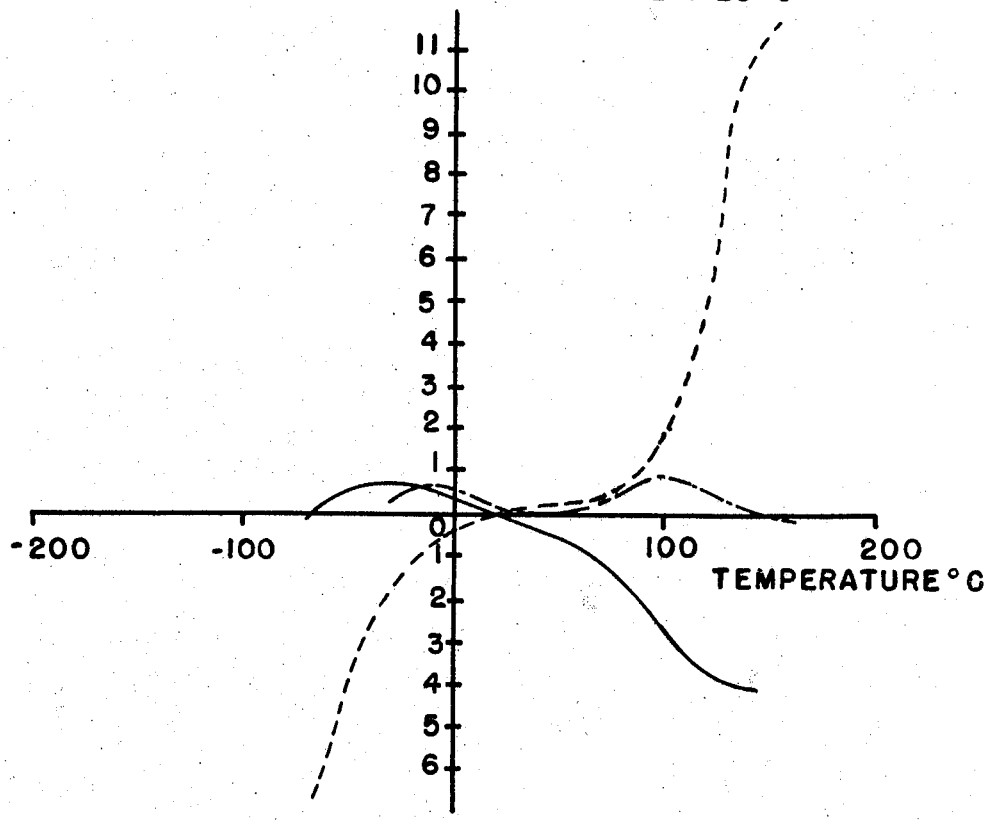
FIG. 5 is a graph of the capacitance of one of the instant copolymers at various temperatures.
Figure 6:
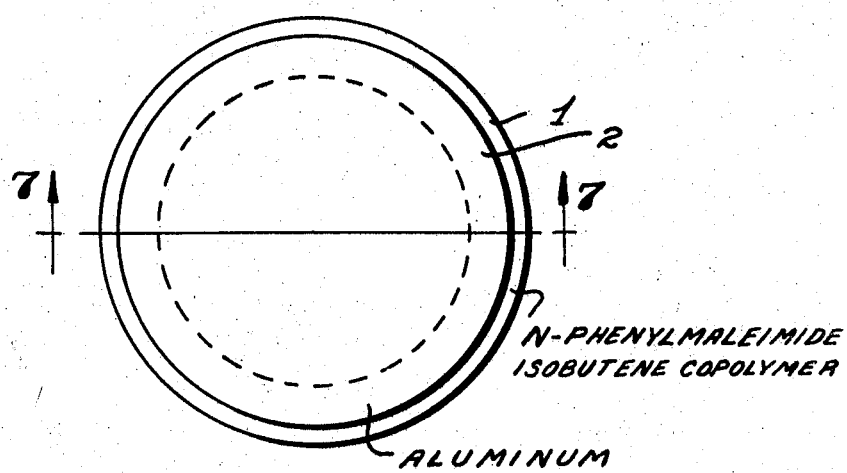
FIG. 6 is a plan view of a test capacitor using the instant polymers as dielectric.
Figure 7:
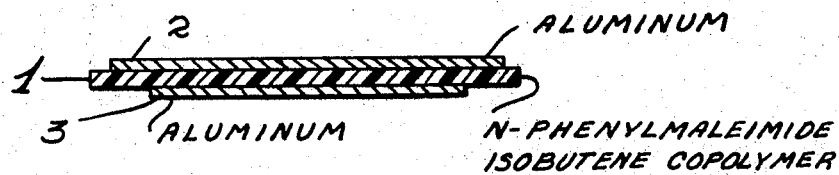
FIG. 7 is a cross-section along lines 7—7 of FIGURE 6.

The capacitance at 1000 cycles of the capacitor formed from the copolymer of N-phenylmaleimide and isobutene in the manner described in Example 1 was measured at different temperatures over the range —70° C. to +140° C. The change in capacitance, expressed as percent change from the value at 20° C., was plotted against temperature to give the continuous line curve shown in FIGURE 5 of the accompanying drawings. Curves for the capacitance of capacitors derived from the commercially available polyethylene terephthalate (broken line) and from the commercially available polycarbonate (dash-dot line), both mentioned in Example 1, are also included for comparison. In all cases, the capacitance was measured using the samples, apparatus and conditions described in Example 1.

Example 4

Capacitors were made following the process described in Example 1 from copolymers of N-phenylmaleimide and butadiene, and N-o-tolylmaleimide and isobutene. The power factor of the dielectric material in each case was measured at 1000 cycles and 20° C. using the apparatus and conditions described in Example 1. They were found to be 0.00054 and 0.00035 respectively. By way of comparison, the power factor of a copolymer of maleimide and isobutene measured under the same conditions was found to be 0.0045, higher by a factor of ten.

Example 5

A capacitor was formed as follows. A copolymer of N-phenylmaleimide and isobutene was cast from solution in chloroform on to flat clean aluminum foil at room temperature forming a film 0.05 mm. thick, and then the temperature of the coated foil was raised slowly to about 230° C. and kept there for 2 hours. A disc 18 mm. in diameter was cut from the laminate so produced and was coated with an aluminum film on its plastic face by electrode deposition in vacuo. The coating was in the form of a circle 10 mm. in diameter and concentric with the disc.

The capacitor was then inserted in the apparatus described in Example 1 and the power factor of the dielectric material at radio frequencies and room temperature was found to be of the same order as that in the capacitor of Example 1 formed from a sheet of the same polymer.

We claim:

1. A capacitor comprising a pair of electrically conductive members, a dielectric between said members and means for connecting said members to electrical power, said dielectric comprising a copolymer of from 99% to 1% molar of at least one N-aryl maleimide and from 1% to 99% molar of at least one ethylenically unsaturated hydrocarbon which has a power factor of less than about 0.004 over the temperature range —10 to 160° C. when measured at 1000 cycles per second.

2. A capacitor as set forth in claim 1 in which the copolymer of the dielectric contains approximately equimolar amounts of N substituted maleimide and the said hydrocarbon.

3. A capacitor as set forth in claim 1 in which the aryl radical in the N-substituted maleimide is free from polar substituents.

4. A capacitor as set forth in claim 1 in which the ethylenically unsaturated hydrocarbon is ethylene, propylene, styrene, a hydrocarbon-substituted derivative of styrene, or a vinylidene hydrocarbon of the formula $CH_2:CR^1R^2$ in which $R^1$ and $R^2$ are severally monovalent hydrocarbon radicals.

5. A capacitor as set forth in claim 1 in which said dielectric comprises a copolymer of N-phenyl maleimide and isobutene in approximately equimolar amounts.

6. An electrical apparatus comprising a coil having a plurality of turns of a wire and insulation for said coil, said insulation comprising a copolymer of from 99% to 1% molar of at least one N-aryl maleimide and from 1% to 99% molar of at least one ethylenically unsaturated hydrocarbon which has a power factor of less than about 0.004 over the temperature range —10 to 160° C. when measured at 1000 cycles per second.

7. An electrical apparatus as set forth in claim 6 in which the copolymer of the insulation contains approximately equimolar amounts of N substituted maleimide and the said hydrocarbon.

8. An electrical apparatus as set forth in claim 6 in which the aryl radical in the N-substituted maleimide is free from polar substituents.

9. An electrical apparatus as set forth in claim 6 in which the ethylenically unsaturated hydrocarbon is ethylene, propylene, styrene, a hydrocarbon-substituted derivative of styrene, or a vinylidene hydrocarbon of the formula $CH_2:CR^1R^2$ in which $R^1$ and $R^2$ are severally monovalent hydrocarbon radicals.

10. An electrical apparatus as set forth in claim 6 in which said insulation comprises a copolymer of N-phenyl maleimide and isobutene in approximately equimolar amounts.

11. An electrical apparatus as set forth in claim 6 which is an electric motor and said insulation is a slot liner.

12. An electrical apparatus as set forth in claim 6 which is an electric motor and in which said insulation is phase insulation.

13. An electrical apparatus as set forth in claim 6 which is a choke and in which said insulation is interlayer insulation.

14. An electric cable comprising a plurality of insulated electrical conductors, the insulation comprising a copolymer of from 99% to 1% molar of at least one N-aryl maleimide and from 1% to 99% molar of at least one ethylenically unsaturated hydrocarbon which has a power factor of less than about 0.004 over the temperature range —10 to 160° C. when measured at 1000 cycles per second.

15. An electric cable as set forth in claim 14 in which the copolymer of the insulation contains approximately equimolar amounts of N-substituted maleimide and the said hydrocarbon.

16. An electric cable as set forth in claim 14 in which the aryl radical in the N-substituted maleimide is free from polar substituents.

17. An electric cable as set forth in claim 14 in which the ethylenically unsaturated hydrocarbon is ethylene, propylene, styrene, a hydrocarbon-substituted derivative of styrene, or a vinylidene hydrocarbon of the formula $CH_2:CR^1R^2$ in which $R^1$ and $R^2$ are severally monovalent hydrocarbon radicals.

18. An electric cable as set forth in claim 14 in which the insulation comprises a copolymer of N-phenyl maleimide and isobutene in approximately equimolar amounts.

References Cited

UNITED STATES PATENTS

| | | | |
|---|---|---|---|
| 3,378,419 | 4/1968 | Elch et al. | 156—53 |
| 2,320,866 | 6/1943 | Hill | 310—215 |
| 2,495,010 | 1/1950 | Kirkpatrick | 310—215 |
| 2,665,400 | 1/1954 | Walker | 317—258 |
| 2,764,718 | 9/1956 | Peck et al. | 317—258 |
| 2,924,799 | 2/1960 | Hatfield | 336—199 X |
| 3,209,064 | 9/1965 | Cutler | 174—113 X |
| 3,368,174 | 2/1968 | Fischer | 336—199 X |
| 2,887,649 | 5/1959 | Peck | 317—242 X |
| 3,047,782 | 7/1962 | McCarthy | 317—242 X |
| 3,206,542 | 9/1965 | Dawson et al. | 174—110 X |
| 3,229,021 | 1/1966 | Kang | 174—110 X |
| 3,352,832 | 11/1967 | Barr et al. | 260—78 |
| 2,301,356 | 11/1942 | Arnold et al. | 260—78 |
| 2,516,030 | 7/1950 | Swiss | 156—52 |
| 3,035,027 | 5/1962 | Tawney | 260—78 |
| 3,137,678 | 6/1964 | Jousset | 260—78 |

HAROLD ANSHER, *Primary Examiner.*

U.S. Cl. X.R.

174—113; 336—199; 317—258; 260—78; 117—232, 132; 156—51; 161—219